United States Patent
Sedlacek et al.

(10) Patent No.: US 6,398,015 B1
(45) Date of Patent: Jun. 4, 2002

(54) ROLLER-TOP CONVEYOR BELT AND MODULES WITH CLOSELY-SPACED ROLLERS

(75) Inventors: Kyle J. Sedlacek, New Orleans; Andrew A. Corley, Harahan, both of LA (US)

(73) Assignee: The Laitram Corporation, Harahan, LA (US)

( * ) Notice: Subject to any disclaimer, the term of this patent is extended or adjusted under 35 U.S.C. 154(b) by 0 days.

(21) Appl. No.: 09/564,113

(22) Filed: May 3, 2000

(51) Int. Cl.⁷ ............................................... B65G 17/24
(52) U.S. Cl. ...................................................... 198/779
(58) Field of Search ................................... 198/779, 853

(56) References Cited

U.S. PATENT DOCUMENTS

| | | | |
|---|---|---|---|
| 3,550,756 A | 12/1970 | Kornylak | 198/183 |
| 4,231,469 A * | 11/1980 | Arscott | 198/779 |
| D289,734 S * | 5/1987 | Schroeder et al. | D8/499 |
| D299,424 S * | 1/1989 | Schroeder et al. | D8/499 |
| D299,425 S * | 1/1989 | Schroeder et al. | D8/499 |
| 4,821,869 A * | 4/1989 | Hodlewsky | 198/779 |
| 4,880,107 A | 11/1989 | Deal | 198/779 |
| 4,909,380 A * | 3/1990 | Hodlewsky | 198/779 |
| 4,993,540 A * | 2/1991 | van Capelleveen | 198/779 |
| 5,096,050 A * | 3/1992 | Hodlewsky | 198/779 |
| 5,224,583 A * | 7/1993 | Palmaer et al. | 198/779 |
| 5,238,099 A | 8/1993 | Schroeder et al. | 198/456 |
| 5,261,525 A * | 11/1993 | Garbagnati | 198/779 |
| 5,330,045 A * | 7/1994 | Hodlewsky | 198/779 |
| 5,404,997 A | 4/1995 | Schrier et al. | 198/779 |
| 5,904,241 A * | 5/1999 | Verdigets et al. | 198/853 |

* cited by examiner

Primary Examiner—Joseph E. Valenza
(74) Attorney, Agent, or Firm—James T. Cronvich

(57) ABSTRACT

A low backline pressure conveyor belt and modules therefor characterized by modules having thin upstanding supports supporting a transverse axle on which article-conveying rollers are rotatably mounted in a closely-spaced relationship.

16 Claims, 3 Drawing Sheets

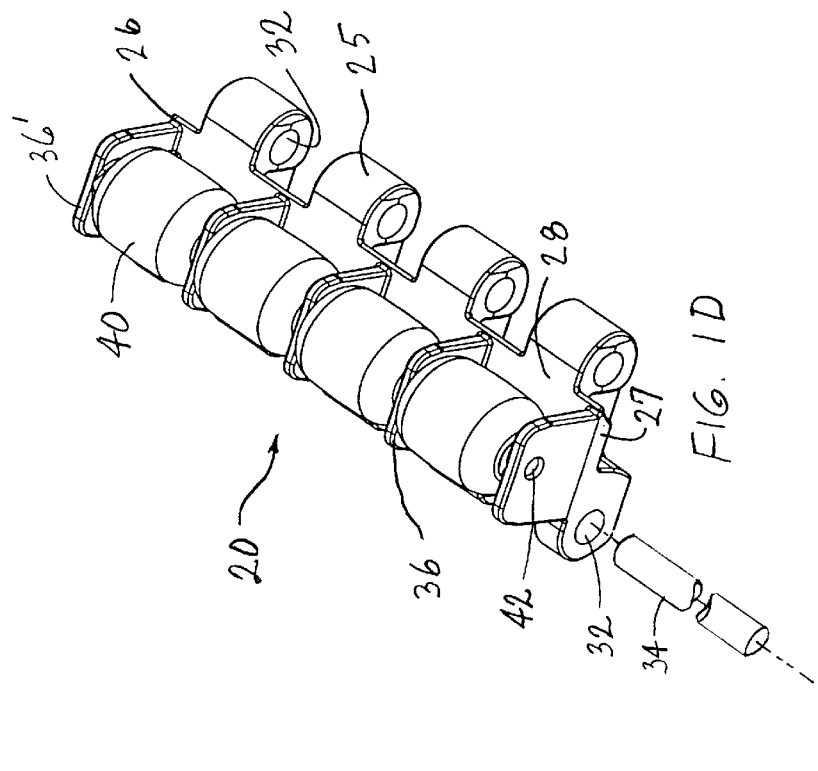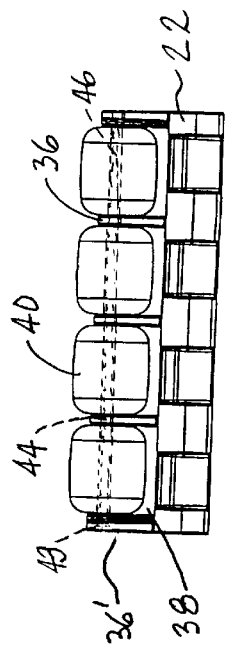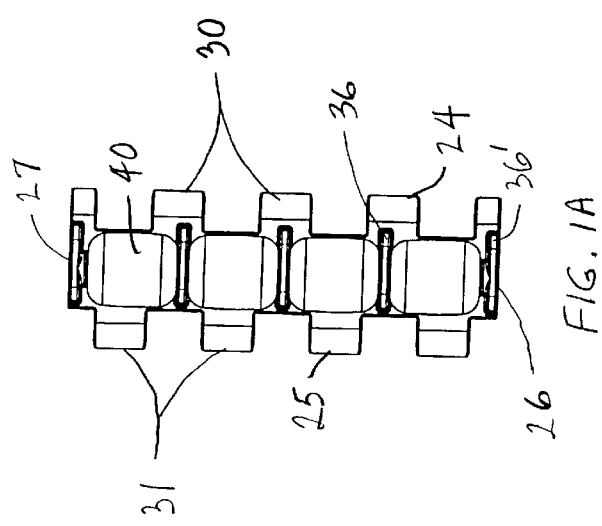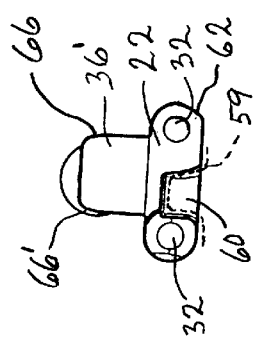

ROLLER-TOP CONVEYOR BELT AND MODULES WITH CLOSELY-SPACED ROLLERS

FIELD OF THE INVENTION

The invention relates to power-driven conveyors and, more particularly, to modular conveyor belts constructed of rows of belt modules hingedly interlinked end-to-end by hinge pins.

BACKGROUND

Conventional modular conveyor belts and chains are made up of modular links, or belt modules, arranged in rows. Spaced apart link ends extending from each end of the modules include aligned apertures. The link ends along one end of a row of modules are interleaved with the link ends of an adjacent row. A pivot rod, or hinge pin, journaled in the aligned apertures of the end-to-end-connected rows, connects adjacent rows together to form an endless conveyor belt capable of articulating about a drive sprocket.

In many industrial applications, articles are allowed to accumulate on a continuously moving conveyor belt before being off-loaded. Friction between the conveying surface of the moving belt and the accumulated articles causes the articles to push against each other, increasing backline pressure. Backline pressure can cause damage to the articles, excessively load the conveyor belt and its drive components, and accelerate belt wear. Rotatable elements, such as rollers, in rolling contact with the undersides of conveyed articles have been used to reduce friction and lower backline pressure.

In some conveyor belts designed for low backline pressure, cylindrical rollers are positioned on the pivot rod. But, to provide room for the rollers on the pivot rod, the belt must be designed with fewer or thinner link ends, resulting in diminished belt pull strength. Likewise, the rollers must be limited in number along a pivot rod, which introduces significant spaces between consecutive rollers and imposes a lower limit on the size of the articles that can be conveyed. The large spacing between rollers also causes more vibration and jostling of accumulating articles. Furthermore, rollers on pivot rods are typically narrow, which can cause high contact pressure on conveyed articles and on the pivot rod.

In other roller-top conveyor belts or chains, rollers are positioned on dedicated pins. In some cases, the dedicated pins are supported above the base of the belt with one or more rollers positioned on the pin between spaced end supports. This design permits a high roller density, but the rollers are generally small in diameter with a number of rows of rollers on each module. High roller density is achieved by increasing the spacing between supports, which limits the weight of the load that can be borne by the rollers without causing the pin to sag and the rollers to bind. In other cases, larger rollers supported on dedicated pins are recessed in cavities in the module's base with only a small upper portion of the roller extending above the surface of the base. The rollers are supported on dedicated pins embedded in the walls of the cavities for strength. In these belt modules, however, the roller density is limited because the cavities reduce the pull strength of the belt. Furthermore, dirt and debris can be trapped in the cavities.

Thus, there is a need for a low backline pressure conveyor belt that has high belt pull strength and well-supported rollers arranged in a high-density pattern for handling heavy articles.

SUMMARY

This need and others are satisfied by the invention, which provides a belt module that is formed of a base extending from a first end to a second end and transversely across its width from a first side to a second side. A first set of spaced-apart hinge elements extends from the first end of the base. A second set, offset transversely from the first set, extends from the second end of the base. Transverse apertures are formed in the hinge elements. The base has an upper deck across which are spaced a plurality of supports. A transverse opening is formed in consecutive supports. The transverse openings in the supports are aligned to accept an axle. A roller is positioned in each space between consecutive supports with the axle through an axial bore in the roller. The length of the roller bore is slightly less than the support spacing to provide formidable support for the roller. The thickness of each support, measured in the widthwise direction of the module, is much less than the space between consecutive supports to closely position the rollers across the module.

A conveyor belt can be constructed of modules according to the invention. A plurality of the modules are arranged end-to-end. The first set of hinge elements of each belt module are interleaved with the second set of hinge elements of an adjacent module. Hinge pins extend through the aligned transverse apertures of the interleaved hinge elements to form a conveyor belt with parallel rows of rollers. In a preferred version of the belt, the pitch of the belt is related to the dimension of the rollers in the pitch direction so that consecutive parallel rows of rollers are separated by a gap narrower than the dimension of the rollers in the pitch dimension. Thus, a belt made according to the invention provides low backline pressure with a high-density array of well-supported, closely-spaced rollers to support heavy articles with less vibration and jostling during accumulation and without compromising belt pull strength.

BRIEF DESCRIPTION OF THE DRAWINGS

These and other advantages, features, and aspects of the invention are described in more detail in the following description, appended claims, and accompanying drawings, in which:

FIGS. 1A–D are, respectively, top plan, front elevational, side elevational, and perspective views of a belt module having features of the invention;

DETAILED DESCRIPTION OF THE PREFERRED EMBODIMENTS

Figure 2:
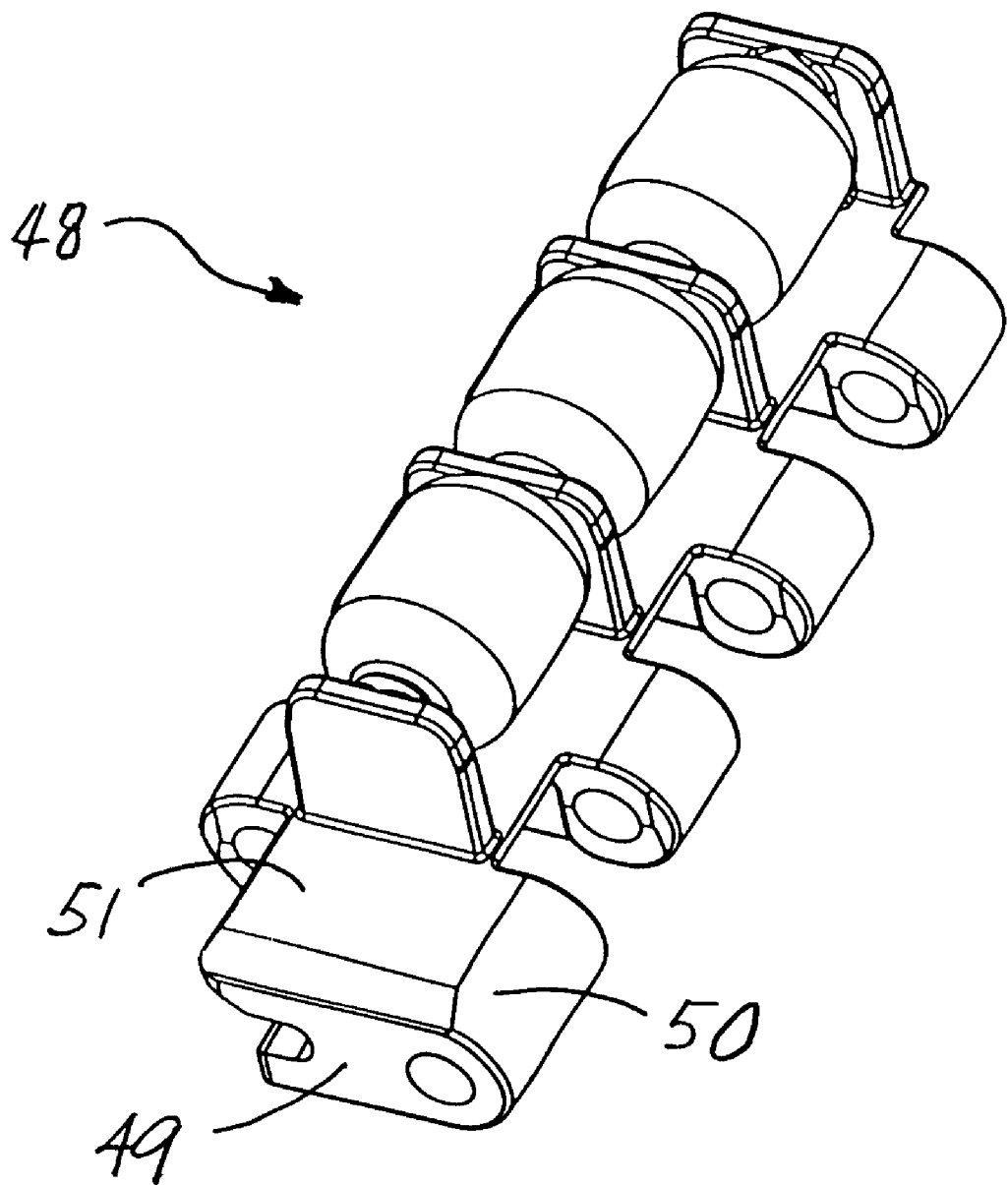
FIG. 2 is a perspective view of a belt module as in FIG. 1 especially designed for the edge of a belt.

A belt module embodying, features of the invention is shown in FIGS. 1A–D. The module includes a base 22 that extends from a first end 24 to a second end 25 in a longitudinal direction of the module and transversely across its width from a first side 26 to a second side 27. The base is topped by a deck 28, which is shown as a flat deck in this example. A first set of hinge elements 30, spaced apart along the first end of the module, is transversely offset from a second set of hinge elements 31, spaced apart along the second end. Transverse apertures 32 are formed in each set to accept a hinge pin 34, preferably plastic or metal.

Upstanding supports 36 extend upward from the deck. The supports are preferably thin in the transverse direction. Although the supports shown are substantially equal in thickness, the thickness could vary with, for example, thicker supports at the outermost support positions. The supports are spaced apart across the width of the module with a space 38 defined between consecutive supports. The spaces are sized to accommodate rollers, such as cylindrical rollers 40. Each support, except perhaps for a first outermost support 36', has a transverse opening 42 extending completely through the support. The first outermost support has an aligned transverse opening that could extend completely through or could alternatively have a blind end 43 at the outer side for cosmetic or other reasons. The openings of the supports are transversely aligned to admit an axle 44, preferably stainless steel for strength and durability. The axle could alternatively be made of a synthetic polymer or other appropriate material. The transverse openings shown are circular and encircle the circumference of the axle. The openings in the inner supports could alternatively be open on top forming lower support cradles across which the axle lies. Bores 46 extend axially through each of the cylindrical rollers. The axle extends through the bores about which the rollers are free to rotate. A fairly high roller-diameter-to-axle-diameter ratio, e.g., on the order of 5:1, provides the rollers with a significant mechanical advantage for easy rolling. Each roller is sized in the axial length direction to be slightly less than the transverse dimension of the corresponding space between consecutive supports. The supports are preferably thin in the transverse direction so that each module provides a roller top with only small interruptions between rollers.

The supports are preferably injection molded integrally with the base of the module out of a plastic polymer, such as polyethylene, polypropylene, acetal, or nylon. (The base of the module depicted in the drawing is similar to the Intralox Series 1400 belt module manufactured by Intralox, Inc. of Harahan, La.) The axle is threaded through the transverse openings in the supports and through the bores of the rollers. Preferably, the diameter of the axle is sized slightly greater than the diameters of the transverse support openings, so that the axle can be press-fit tightly in the openings. Because the diameter of a roller is preferably much greater than the diameter of its bore, the roller gains a mechanical advantage that allows it to rotate easily. A stainless steel axle provides the strength necessary to avoid sagging and to prevent the roller from binding against the deck. The modules shown in FIGS. 1A–D accommodate four rollers, but modules that accommodate fewer or more rollers could just as easily be molded.

An edge module 48, used together with modules as in FIGS. 1A–D to construct a modular conveyor belt, is shown in FIG. 2. The edge module is similar to the module of FIGS. 1A–D, except that the version shown accommodates three rollers and includes an edge portion 50 with an exposed upper deck portion 51, or indent, that can serve as a bearing surface for a shoe or roller (neither shown) commonly used to support conveyor belts along the returnway. The edge portion also includes a flush side edge 49 to avoid snagging.

Figure 3:
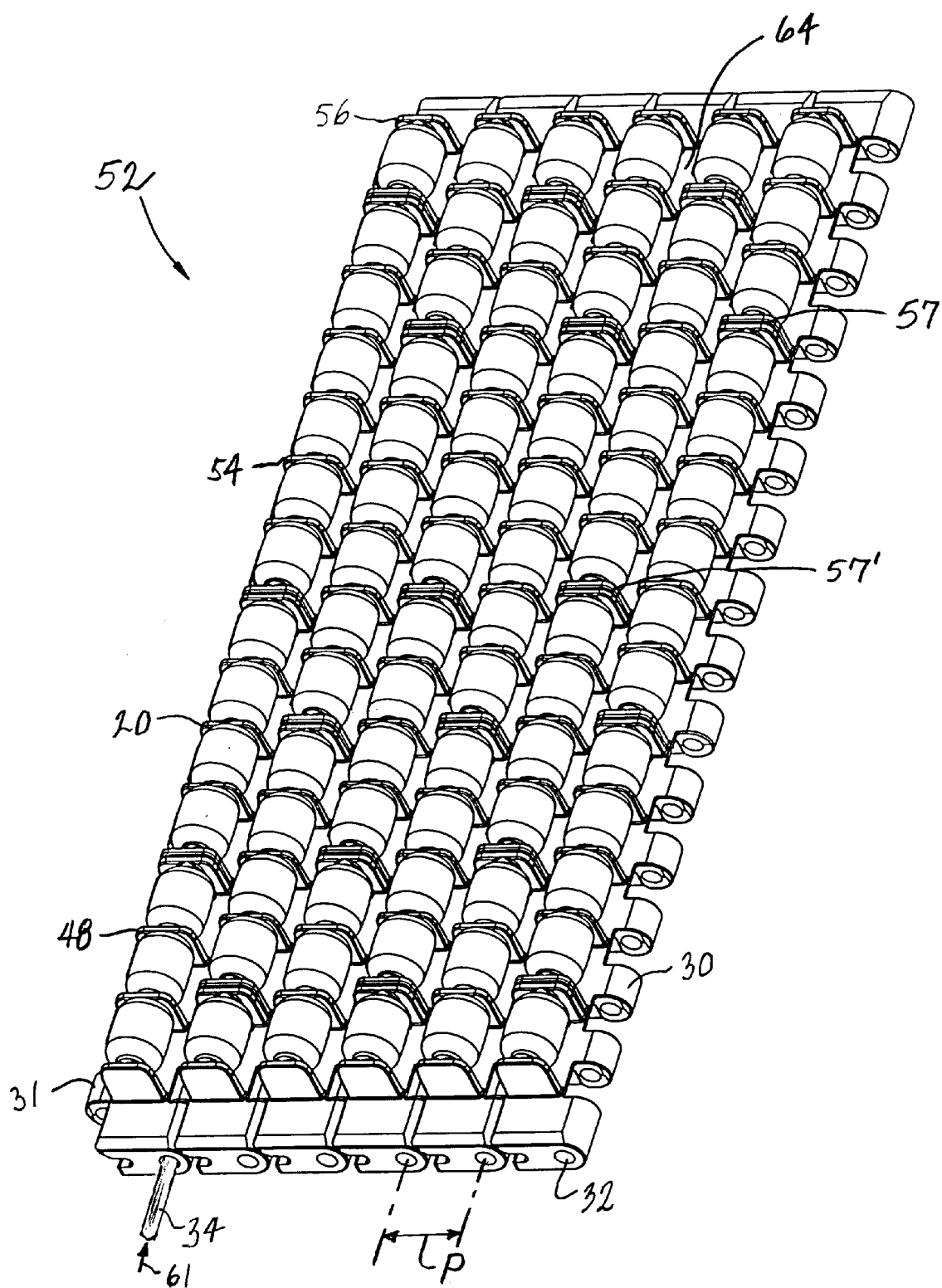
FIG. 3 is a perspective view of a portion of a conveyor belt constructed of the modules of FIGS. 1 and 2.

A portion of a conveyor belt 52 constructed of modules such as those in FIGS. 1 and 2 is shown in FIG. 3. The belt is constructed of a series of rows of belt modules. As depicted in FIG. 3, each row includes an internal four-roller module 20, an internal six-roller module 54, a three-roller edge module 48, and a one-roller edge module 56. The modules are preferably constructed in a bricklaid pattern so that the seams 57 between side-by-side modules on one row are discontinuous with the seams 57' of an adjacent row. The first set of hinge elements 30 of a row are interleaved with the second set of hinge elements 31 of an adjacent row and articulably retained by a hinge pin 34 inserted fully in the direction of arrow 61 through the aligned transverse apertures 32 to form a conveyor belt of any desired length. The belt may be driven by a sprocket 59 or drum engaging conventional drive structure, such as drive pockets 60 or drive surfaces 62 on hinge elements best seen in FIG. 1C. (Sprockets such as Intralox Series 1400sprockets could be used to drive the belt of FIG. 3.)

As previously mentioned, the thin supports allow the rollers to be spaced closely together in a well-supported arrangement along each row. The modules 20, 48, 54, 56 are preferably relatively short in length so that, when the modules are bricklaid in a belt, the transverse gaps 64 between roller rows is small. Preferably, the rollers are sized relative to the module pitch P (the distance between the centerlines of the transverse apertures of the first and second sets of hinge elements) so that the gap between adjacent rows of rollers is less than the diameter of the rollers. In this way, a conveyor belt constructed of the depicted modules provides a low backline pressure conveying surface characterized by easy-rolling, well-supported, closely-spaced rollers with few binding joints and few interruptions that might catch on conveyed articles or cause accumulating articles to be jostled. On the returnway, conveyor belts often backflex between shoes or other bearing surfaces. To prevent the rollers of one belt row of the roller-top conveyor belt from binding against the rollers of an adjacent row during backflexing, the supports 36, 36' (best shown in FIG. 1C) are sized relative to the roller diameter so that the supports on one row contact the supports on an adjacent row during backflexing and provide clearance between rollers so that they can rotate freely. Flats 66, 66' on the supports provide an extended contact area between the supports of adjacent belt rows during backflexing.

Although the invention has been described in detail with reference to preferred module versions, other versions are possible. For example, a conveyor belt can be constructed of modules having one or more rows of rollers. Modules without rollers and supports could be used together with roller-top modules to construct a belt with larger gaps between roller rows or larger spacings between rollers on a row. Modules of various widths and numbers of rollers are possible. The supports shown as rectangular in shape could be triangular or semicircular or trapezoidal or otherwise shaped. The rollers could be shaped other than cylindrical: spherical, for example. Edge modules need not include indents, but could be more like the module shown in FIG. 1, in which the rollers extend substantially across the entire width of the module. The roller and support structure of the invention is adaptable for use on sideflexing, as well as straight-running, belts. The upper deck could be continuous as shown or could include open areas for drainage, air flow, or lighter weight. Therefore, as these examples suggest, the spirit and scope of the claims are not limited to the description of the preferred versions.

What is claimed is:

1. A belt module, comprising:
a base extending from a first end to a second end and transversely across its width from a first side to a second side, the base including an upper deck;
a first set of hinge elements extending from the first end and spaced apart along the width of the module, each of the first set of hinge elements forming a transverse aperture therethrough;
a second set of hinge elements extending from the second end and spaced apart along the width of the module, each of the second set of hinge elements forming a transverse aperture therethrough;

a plurality of supports upstanding from the upper deck and spaced apart across the width of the module to define a space between consecutive supports, wherein consecutive supports form aligned transverse openings and have transverse thickness dimensions;

an axle supported by the aligned transverse openings of the consecutive supports; and a plurality of rollers, each including a central axial bore to accommodate the axle and each disposed in a respective one of the spaces between consecutive supports, wherein each space is slightly greater along the width of the module than the axial length of the roller disposed in the space and much greater than the transverse thickness dimensions of the supports to provide the module with individually supported rollers closely positioned across the width of the module.

2. A belt module as in claim 1, further comprising a first outermost support including a transverse opening with a blind end.

3. A belt module as in claim 1 wherein the transverse openings are circular in cross section and surround the circumference of the axle.

4. A conveyor belt, comprising a plurality of the belt modules of claim 1 arranged end to end with the first set of hinge elements of each belt module interleaved with the second set of hinge elements of an adjacent module and a plurality of hinge pins extending through the aligned transverse apertures of the interleaved hinge elements to form a conveyor belt with parallel rows of closely-spaced rollers.

5. A conveyor belt as in claim 4, wherein the pitch of the belt is related to the dimension of the rollers in the pitch direction so that consecutive parallel rows of rollers are separated by a gap narrower than the dimension of the rollers in the pitch direction.

6. A conveyor belt module, comprising:

a base having a pitch direction and a transverse width and including an upper deck;

a plurality of supports upstanding from the upper deck and spaced apart across the width of the base defining a space between consecutive supports; and a single roller rotatably suspended in the space between consecutive supports.

7. A conveyor belt module as in claim 6, comprising a transverse axle supported by the supports and bridging the space between consecutive supports, wherein the transverse axle rotatably supports a single roller in each space.

8. A conveyor belt module as in claim 6, wherein the plurality of supports each include aligned circular openings.

9. A conveyor belt module as in claim 6, wherein the axial length of the roller is slightly less than the space between supports measured along the width of the module.

10. A conveyor belt module as in claim 6, wherein the thickness of a support is much less than the space measured along the width of the module.

11. A conveyor belt module as in claim 6 wherein the module includes only one row of supports for one row of rollers on each module.

12. A modular conveyor belt, comprising:

a plurality of belt modules each including an upper deck, the belt modules linked together end to end in rows to form a modular conveyor belt;

a plurality of supports upstanding from the upper decks of the belt modules and spaced apart across their widths defining spaces between consecutive supports; and a plurality of rollers each rotatably supported in one of the spaces to form rows of rollers on the conveyor belt.

13. A modular conveyor belt as in claim 12 wherein each module includes a single row of supports.

14. A modular conveyor belt as in claim 12 wherein the rows of rollers are spaced with a gap between consecutive rows that is less than the diameter of the rollers.

15. A modular conveyor belt as in claim 12 wherein each module includes a transverse axle supported by the supports and on which the rollers are rotatably mounted.

16. A modular conveyor belt as in claim 15 wherein the supports of a module form aligned transverse openings surrounding the circumference of the transverse axle.

* * * * *